United States Patent
Robertson et al.

(10) Patent No.: US 9,646,763 B2
(45) Date of Patent: May 9, 2017

(54) CONTACTLESS POWER TRANSFER SYSTEM

(75) Inventors: Daniel Robertson, Auckland (NZ); Kunal Bhargava, Auckland (NZ); Fady Mishriki, Auckland (NZ); Saining Sunny Ren, Auckland (NZ); Robert Walton, Auckland (NZ); Eugenio Sia Lecias, Jr., Auckland (NZ)

(73) Assignee: PowerbyProxi Limited, Freemans Bay, Auckland (NZ)

( * ) Notice: Subject to any disclaimer, the term of this patent is extended or adjusted under 35 U.S.C. 154(b) by 1081 days.

(21) Appl. No.: 13/825,811

(22) PCT Filed: Sep. 23, 2011

(86) PCT No.: PCT/NZ2011/000199
§ 371 (c)(1),
(2), (4) Date: Oct. 7, 2013

(87) PCT Pub. No.: WO2012/039635
PCT Pub. Date: Mar. 29, 2012

(65) Prior Publication Data
US 2014/0021795 A1   Jan. 23, 2014

(30) Foreign Application Priority Data
Sep. 23, 2010   (NZ) ........................................ 588159

(51) Int. Cl.
*H01F 38/18*   (2006.01)
*H01F 38/14*   (2006.01)
*H02J 5/00*    (2016.01)

(52) U.S. Cl.
CPC ............. *H01F 38/14* (2013.01); *H01F 38/18* (2013.01); *H02J 5/005* (2013.01)

(58) Field of Classification Search
CPC  H01F 38/14; H01F 38/18; H02J 5/005; H02J 50/00; H02J 50/90
(Continued)

(56) References Cited

U.S. PATENT DOCUMENTS

| 4,345,230 A | * | 8/1982 | Chass | H01F 21/06 336/135 |
| 5,301,096 A | * | 4/1994 | Klontz | H01F 38/14 320/108 |

(Continued)

FOREIGN PATENT DOCUMENTS

| CN | 101478182 A | * | 7/2009 |
| EP | 1 211 776 | | 6/2002 |

(Continued)

OTHER PUBLICATIONS

International Search Report mailed Jan. 16, 2012 for PCT/NZ2011/000199, 3 pgs.

(Continued)

*Primary Examiner* — Jared Fureman
*Assistant Examiner* — Michael Warmflash
(74) *Attorney, Agent, or Firm* — Merchant & Gould P.C.

(57) ABSTRACT

A contactless inductively coupled power transfer system is provided including multiple pairs of power transmitter and power receiver coils and a power management module for controlling the supply of power to transmitter coils or the power supplied by the power receiver module to loads. The design is particularly suited for use in a wind turbine to supply power to the nacelle. The transmitter coils may be driven in phase at the same frequency or at different frequencies selected to avoid interaction between transmitter coils and the power transmitter module. The transmitter and receiver coils may be arranged in a traditional slip ring type configuration with adjacent coil pairs are physically spaced (Continued)

apart to avoid cross coupling with adjacent transmitter and receiver coil pairs shielded from each other. The power transmitter module may employ Zero Voltage Switching (ZVS).

24 Claims, 4 Drawing Sheets

(58) Field of Classification Search
USPC ............................................. 307/104
See application file for complete search history.

(56) References Cited

U.S. PATENT DOCUMENTS

| | | | | |
|---|---|---|---|---|
| 5,347,256 | A * | 9/1994 | Yumiki | H01F 38/18 336/120 |
| 6,101,084 | A * | 8/2000 | Rakov | G01D 5/2412 361/277 |
| 8,174,134 | B2 * | 5/2012 | Bohori | H01F 38/18 290/1 R |
| 8,288,894 | B2 * | 10/2012 | Yoshimura | H04L 25/0266 307/104 |
| 2003/0218892 | A1 * | 11/2003 | Nakagawa | H02M 3/33569 363/56.12 |
| 2005/0046194 | A1 | 3/2005 | Wobben | |
| 2008/0089103 | A1 * | 4/2008 | Hsu | H02M 7/5387 363/132 |
| 2009/0230777 | A1 * | 9/2009 | Baarman | H01F 38/14 307/104 |
| 2009/0280012 | A1 | 11/2009 | Caffrey | |
| 2010/0066340 | A1 * | 3/2010 | Delforge | A61B 6/56 323/305 |
| 2010/0314947 | A1 * | 12/2010 | Baarman | H02J 5/005 307/104 |
| 2011/0285210 | A1 * | 11/2011 | Lemmens | H02J 5/005 307/104 |

FOREIGN PATENT DOCUMENTS

| | | |
|---|---|---|
| EP | 2 067 231 | 9/2009 |
| NZ | 274939 | 6/1997 |
| NZ | 247938 | 5/1998 |
| TW | 201004087 A | 1/2010 |
| WO | WO 2009/045847 | 4/2009 |
| WO | WO 2010/030338 | 3/2010 |
| WO | WO 2010/062198 | 6/2010 |

OTHER PUBLICATIONS

Hao et al., "A parallel topology for inductive power transfer power supplies", The Department of Electrical and Computer Engineering, The University of Auckland, IEEE 2011, pp. 3489-3494.

Covic et al., "Self Tuning Pick-ups for Inductive Power Transfer", Department of Electrical and Computer Engineering, The University of Auckland, IEEE Xplore, Feb. 9, 2010, pp. 2027-2034.

Chinese Office Action for CN Application No. 201180045692.6 mailed Dec. 7, 2015 (9 pages).

* cited by examiner

CONTACTLESS POWER TRANSFER SYSTEM

This application is a National Stage Application of PCT/NZ2011/000199, filed 23 Sep. 2011, which claims benefit of Serial No. 588159, filed 23 Sep. 2010 in New Zealand and which application(s) are incorporated herein by reference. To the extent appropriate, a claim of priority is made to each of the above disclosed applications.

FIELD OF THE INVENTION

This invention relates to a contactless near field inductively coupled power transfer system.

BACKGROUND OF THE INVENTION

In a range of industrial applications power is conveyed between relatively rotating components via slip rings, such as to supply power to the nacelle of a wind turbine. It is common for multiple slip rings to be employed to provide sufficient current handling capacity due to the power handling limitations of a single slip ring. However, conventional slip rings require high levels of maintenance and are prone to failure.

Contactless near field inductively coupled power transfer systems typically employ a single pair of transmission and reception coils to avoid the loose coupling and negative interaction associated with multiple pairs of transmission and reception coils. Typically a single pair of coils is employed sized to transfer the required power. Where redundancy has been required this has been achieved through the provision of an alternate non-inductively coupled link such as via brush type slip rings.

It would be desirable to provide an efficient and reliable power transfer system for transferring power between spaced apart components providing redundancy in fault conditions or to at least provide the public with a useful choice.

Exemplary Embodiments

According to one exemplary embodiment there is provided a contactless near field inductively coupled power transfer system including:
a. a plurality of power transmitter coils;
b. a plurality of power receiver coils each inductively coupled in use to a selected one of the power transmitter coils;
c. a power transmitter module for distributing power to the power transmitter coils;
d. a power receiver module for supplying power received by the power receiver coils to a plurality of associated loads; and
e. a power management module for controlling the supply of power to the power transmitter coils or the power supplied by the power receiver module to the loads;
wherein the power management module controls: the power transmitter module to distribute power to selected ones of the power power transmitter coils based on power demands of the loads.

The power transmitter module may be a single circuit driving all transmitter coils or separate circuits for each channel. The transmitter coils may be driven in phase at the same frequency or at different frequencies selected to avoid interaction between transmitter coils and the power transmitter module. The power receiver module may be a single circuit or may include multiple receiver circuits driving respective transmitter coils. The circuits may be galvanically isolated or share a common ground.

The power management module may control power distribution between drive circuits and power receiver circuits. Control may be based upon user specified power distribution parameters and/or sensed information as to transmitter side faults, receiver side faults, power demand of the loads etc. The power management module may control the power distribution module to utilise the smallest number of transmitter coil and receiver coil pairs possible to supply the required power to the receiver module and utilise isolated faulty channels in the case of fault.

The transmitter and receiver coils may be arranged in a traditional slip ring type configuration with adjacent coil pairs are physically spaced apart to avoid cross coupling with adjacent transmitter and receiver coil pairs shielded from each other. The shields may be formed from Litz wire.

A wireless communication link may be provided to transmit information between transmitter and/or receiver and/or power management modules.

The power transmitter module may employ Zero Voltage Switching (ZVS). At start up if there is stored resonant energy the power transmitter module may follow the ZVS frequency of resonant energy stored. If at start up there is no stored resonant energy the power transmitter module may briefly drive one or more transmission coil and after a delay follow the ZVS frequency of resonant energy stored.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
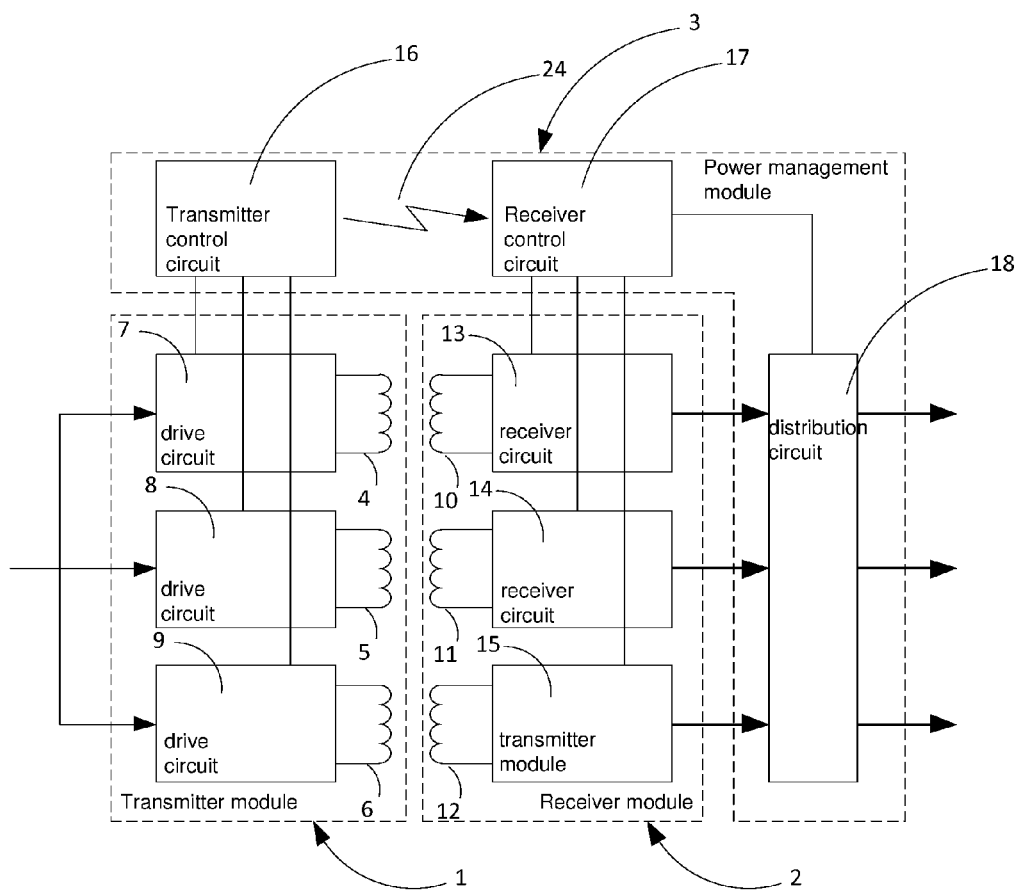
FIG. 1 shows a schematic diagram of a power transfer system.

Referring to FIG. 1 there is shown a power transfer system including a power transmitter module 1, driving transmitter coils 4, 5 and 6. In this embodiment power transmitter module 1 has separate drive circuits 7, 8 and 9, although a single drive circuit could be employed. Power receiver module 2 receives power from coils 10 to 12 inductively coupled with coils 4 to 6 respectively. In this embodiment power receiver module 2 includes separate receiver circuits 13 to 15, although a single circuit could be employed. Circuits 13 to 15 may be galvanically isolated to provide good isolation or may share a common ground for ease of power accumulation.

A power management module 3 controls the supply of power to the transmitter coils 4 to 6 and the distribution of power received by receiver coils 10 to 12 to loads. In this embodiment the power management module 3 includes a transmitter control circuit 16 which controls drive circuits 7, 8 and 9; a receiver control circuit 17 which controls receiver circuits 13 to 15 and a distribution circuit 18 which distributes power to connected loads.

Power management module 3 may include sensors to monitor fault conditions of drive circuits 7, 8 and 9 and receiver circuits 13 to 15. Sensed information and control information may be transmitted via a wireless communications link 24, which may also serve as a communications link for other information (e.g. blade position information and blade tilt control signals in a wind turbine). In the event of a fault in a drive circuit 7 to 9 the faulty circuit may be isolated and power directed to the remaining drive circuits. Likewise in the event of a fault in a receiver circuit the faulty circuit may be isolated and the distribution circuit may distribute power to connected loads. A separate distribution circuit 18 may not be required and a faulty receiver circuit may simply be isolated with the remaining circuits providing a common output supply.

Power management module 3 may store user specified parameters as to control of the circuits including load priorities, preferred operating modes etc. Power management module 3 may also include sensors to monitor power supply and power demand by loads and control operation of the power transfer system to as best as possible meet user specified priorities. Whilst a one to one pairing of transmitter and receiver coils is shown there need not be a one to one relationship and a single transmitter coil could drive multiple receiver coils.

The power transmitter module may employ Zero Voltage Switching (ZVS). At start up if there is stored resonant energy the power transmitter module may follow the ZVS frequency of resonant energy stored. If at start up there is no stored resonant energy the power transmitter module may briefly drive one or more transmission coil and after a delay follow the ZVS frequency of resonant energy stored.

Figure 2:
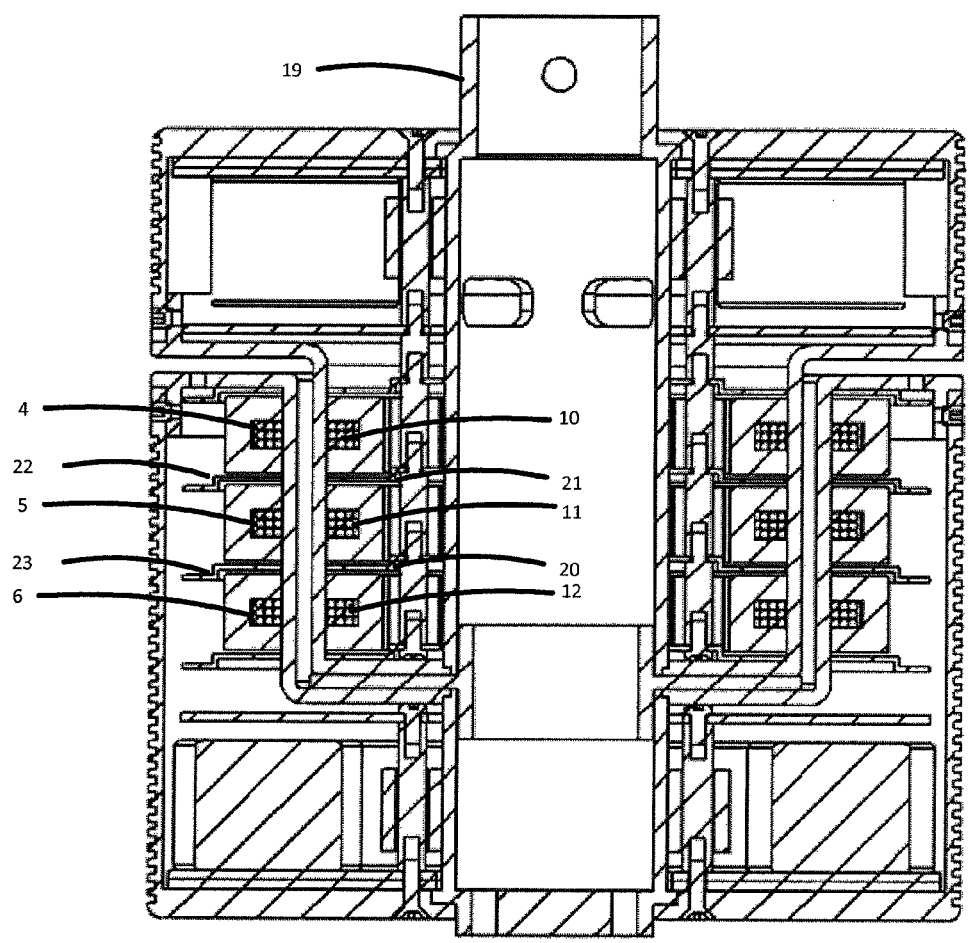
FIG. 2 shows a physical realization of the transmitter and receiver coils of a power transfer system.

Referring to FIG. 2 a physical realization showing power transmitter and receiver coils substituted for slip rings of a wind turbine. Receiver coils 10 to 12 are mounted on shaft 19 and supply power to the nacelle of a wind turbine for pitch control etc. transmitter coils 4 to 6 are stationary and spaced apart from the rotating receiver coils 10 to 12. It will be appreciated that the magnetic fields generated by the transmitter coils 4 to 6 may negatively interact. One approach is to drive all transmitter coils 4 to 6 in phase at the same frequency so that induced currents from adjacent fields are generally constructive. Another approach is drive the coils at different frequencies selected to avoid negative interaction between channels.

Physically spacing apart coil pairs can also reduce negative interaction between channels but space constraints may not allow this. Shielding 20 to 23 may be provided between coil pairs to reduce the effect of magnetic fields from adjacent coil pairs. A preferred shield construction is formed of Litz wire as this undulates towards and away from the surface of the shield so that induced currents are effectively distributed throughout the shield so as to reduce the effective resistance of the shield.

Figure 3:
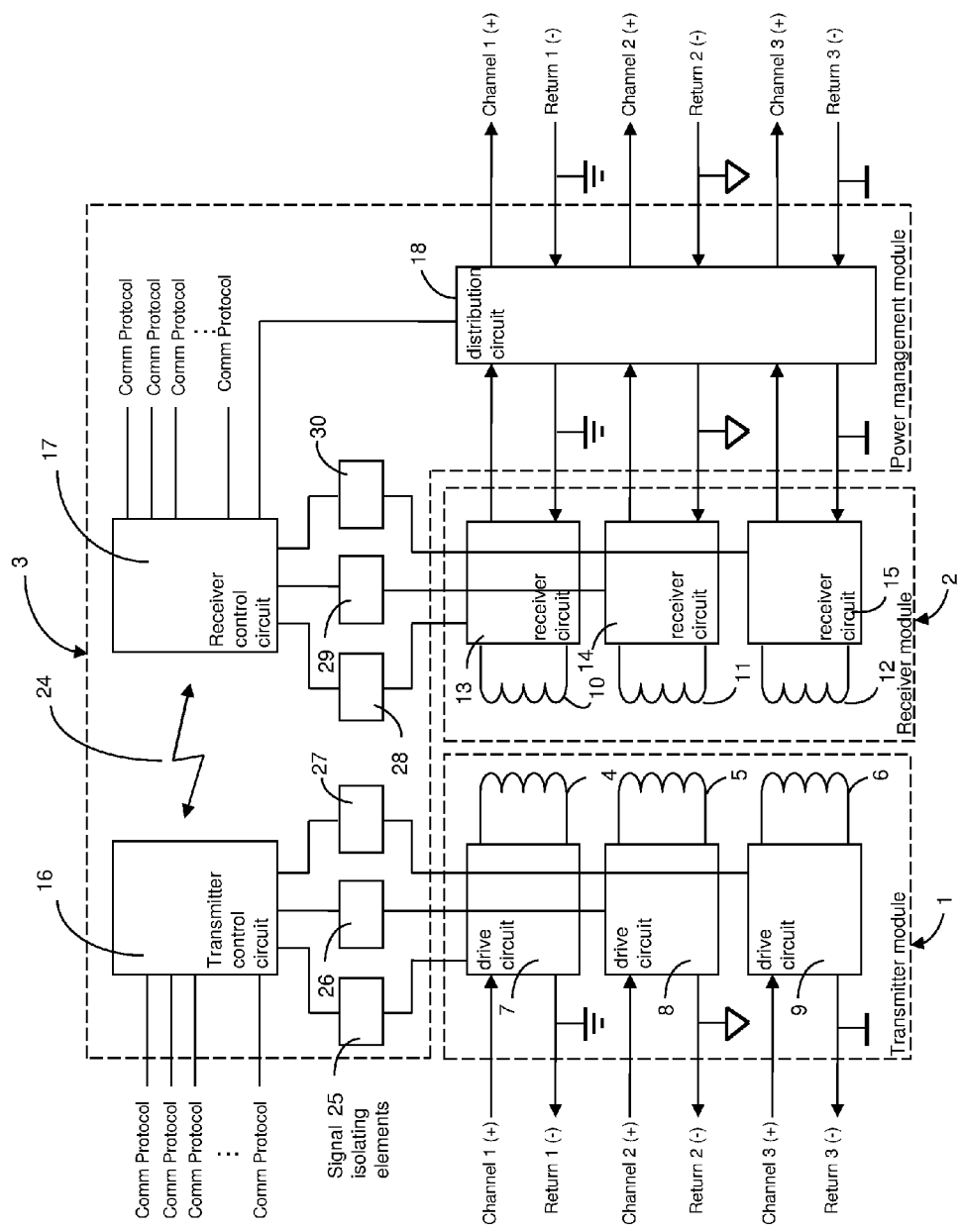
FIG. 3 shows a schematic diagram of a power transfer system with three galvanically-isolated outputs combined with a wireless communication system.

Referring to FIG. 3, one possible embodiment of a power transfer system having three galvanically isolated power channels is shown. Signal isolating elements 25 to 30 maintain isolation between each channel.

Figure 4:
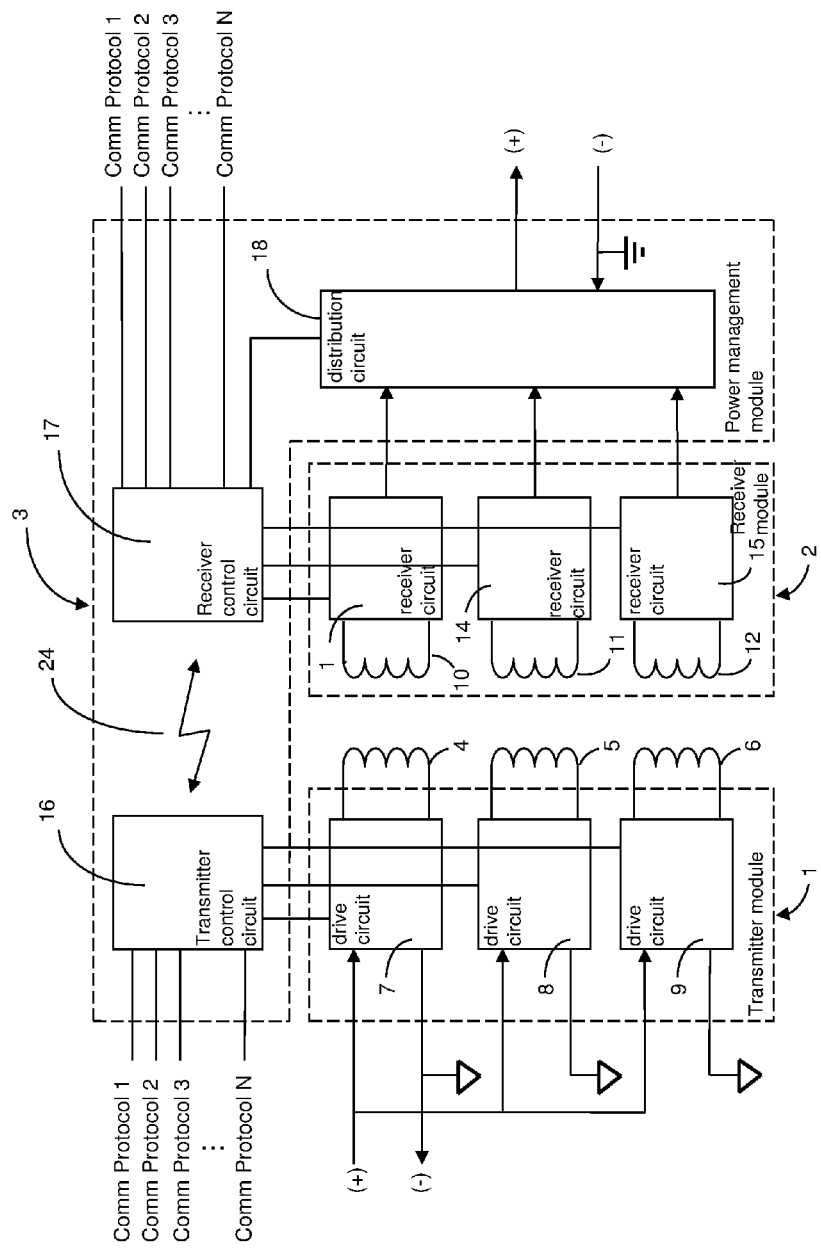
FIG. 4 shows a schematic diagram of a combined power transfer and wireless communication system wherein three power channels share the same ground.

Referring to FIG. 4, another embodiment of a power transfer system having non-isolated power channels is shown. A wireless communication system is also shown capable of simultaneously accepting different communication protocols such as RS485, Ethernet, 4-20 mA, etc. whilst providing wireless communication within the power management module.

There is thus provided an efficient and reliable power transfer system for transferring power between relatively moving components providing redundancy in fault conditions. Negative interactions between channels may be reduced through the use of shielding or by driving transmitter coils at frequencies selected to avoid interference. A method is also provided to enable ZVS operation start-up.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A contactless near field inductively coupled power transfer system including:
   a. a plurality of power transmitter coils;
   b. a plurality of power receiver coils each inductively coupled in use to selected one of the power transmitter coils;
   c. a power transmitter module for distributing power to the power transmitter coils;
   d. a power receiver module for supplying power received by the power receiver coils to a plurality of associated loads; and
   e. a power management module for controlling the supply of power to the power transmitter coils or the power supplied by the power receiver module to the loads,
   wherein the power transmitter coils and power receiver coils are configured to rotate with respect to each other during power transmission, and the power management module controls the power transmitter module to distribute power to selected ones of the power transmitter coils based on power demands of the loads during rotation.

2. A power transfer system as claimed in claim 1 in which the power transmitter module is a single circuit driving all power transmitter coils.

3. A power transfer system as claimed in claim 2 wherein the power transmitter coils are driven in phase at the same frequency.

4. A power transfer system as claimed in claim 2 wherein the power transmitter coils are driven at different frequencies selected to avoid interference between power transmitter coils and the power transmitter module.

5. A power transfer system as claimed in claim 1 in which the power transmitter module includes multiple drive circuits driving respective power transmitter coils.

6. A power transfer system as claimed in claim 1 in which the power receiver module includes multiple receiver circuits driving respective power receiver coils.

7. A power transfer system as claimed in claim 5 wherein adjacent coil pairs are physically spaced apart to avoid cross coupling.

8. A power transfer system as claimed in claim 5 wherein the circuits are galvanically isolated.

9. A power transfer system as claimed in claim 5 wherein the circuits share a common ground.

10. A power transfer system as claimed in claim 5 wherein the power management module controls power distribution between drive circuits.

11. A power transfer system as claimed in claim 6 wherein the power management module controls power distribution between power receiver circuits.

12. A power transfer system as claimed in claim 1 wherein the power management module controls the power transmitter or receiver modules based on user specified power distribution.

13. A power transfer system as claimed in claim 1 including a sensor module for sensing operation of the system and supplying sensed information to the power management module.

14. A power transfer system as claimed in claim 13 wherein the sensor module senses transmitter side faults, such that the power management module controls the power transmitter module to distribute power to the power transmitter coils based on transmitter side fault condition information.

15. A power transfer system as claimed in claim 13 wherein the sensor module senses receiver side faults; such that the power management module controls the power receiver module to distribute power to the power loads based on receiver side fault condition information.

16. A power transfer system as claimed in claim 13 wherein the sensor module senses the power demand of the loads.

17. A power transfer system as claimed in claim 1 wherein the power management module controls the power transmitter module to utilize the smallest number of power transmitter coil and power receiver coil pairs possible to supply the required power to the receiver module.

18. A power transfer system as claimed in claim 1 wherein adjacent power transmitter coil and power receiver coil pairs are shielded with a shield.

19. A power transfer system as claimed in claim 18 wherein the shield is formed from Litz wire.

20. A power transfer system as claimed in claim 1 including a wireless communication link for transmitting information between the power transmitter module and/or the power receiver module and/or the power management module.

21. A power transfer system as claimed in claim 1 wherein the power transmitter module employs Zero Voltage Switching (ZVS).

22. A power transfer system as claimed in claim 21 wherein at start up if there is stored resonant energy the power transmitter module follows the ZVS frequency of resonant energy stored.

23. A power transfer system as claimed in claim 21 wherein at start up if there is no stored resonant energy the power transmitter module briefly drives one or more transmission coil and after a delay follows the ZVS frequency of resonant energy stored.

24. A wind turbine including a power transfer system as claimed in claim 1.

* * * * *